(12) United States Patent
Rhiando

(10) Patent No.: US 7,058,603 B1
(45) Date of Patent: Jun. 6, 2006

(54) TRANSACTION SYSTEM

(75) Inventor: Maxwell Earl Rhiando, Camberley (GB)

(73) Assignee: Nexus Corporation SA., Geneva (CH)

( * ) Notice: Subject to any disclaimer, the term of this patent is extended or adjusted under 35 U.S.C. 154(b) by 752 days.

(21) Appl. No.: 09/614,250

(22) Filed: Jul. 12, 2000

Related U.S. Application Data

(63) Continuation of application No. PCT/GB99/00139, filed on Jan. 15, 1999.

(30) Foreign Application Priority Data

Jan. 16, 1998 (GB) ............................................. 9800854

(51) Int. Cl.
*G06F 17/00* (2006.01)

(52) U.S. Cl. ............................ 705/50; 705/51; 380/29; 380/30; 235/380

(58) Field of Classification Search ................ 713/186, 713/200; 380/284, 283, 285, 29, 30; 705/61, 705/51, 66, 50; 135/380
See application file for complete search history.

(56) References Cited

U.S. PATENT DOCUMENTS

| | | | |
|---|---|---|---|
| 3,833,795 A | 9/1974 | Shoshani et al. | |
| 3,890,599 A | 6/1975 | Simjian | |
| 4,338,025 A | 7/1982 | Engel | |
| 4,636,622 A | 1/1987 | Clark | |
| 5,384,846 A * | 1/1995 | Berson et al. | 380/23 |
| 5,613,012 A * | 3/1997 | Hoffman et al. | 382/115 |
| 5,940,811 A * | 8/1999 | Norris | 705/38 |
| 6,105,007 A * | 8/2000 | Norris | 705/38 |

FOREIGN PATENT DOCUMENTS

| | | |
|---|---|---|
| EP | 0405054 A1 | 2/1990 |
| EP | 0397512 A2 | 11/1990 |
| EP | 0607444 A1 | 7/1994 |
| EP | 0744715 A2 | 11/1996 |
| FR | 2 534 712 A | 4/1984 |
| GB | 2172731 A | 9/1986 |
| GB | 2183356 A | 6/1987 |
| JP | 20002099856 A * | 4/2002 |
| WO | WO 89/00741 | 1/1989 |

\* cited by examiner

*Primary Examiner*—Pierre E Elisca
(74) *Attorney, Agent, or Firm*—Nixon & Vanderhye PC

(57) ABSTRACT

A transaction system includes a network of terminals and a network of servers each form separate communication networks for impersonal transaction and anonymous transmission. No reference to an individual person exists for executing card transactions at a point of sale. The terminals generate impersonal identifiers for a discrete card and user and the servers receive the impersonal identifiers for datafile matching to authorize a transaction at the point of sale for a discrete card and user. No personal identifiers are carried on the card to identify a cardholder, the card is impersonal.

47 Claims, 13 Drawing Sheets

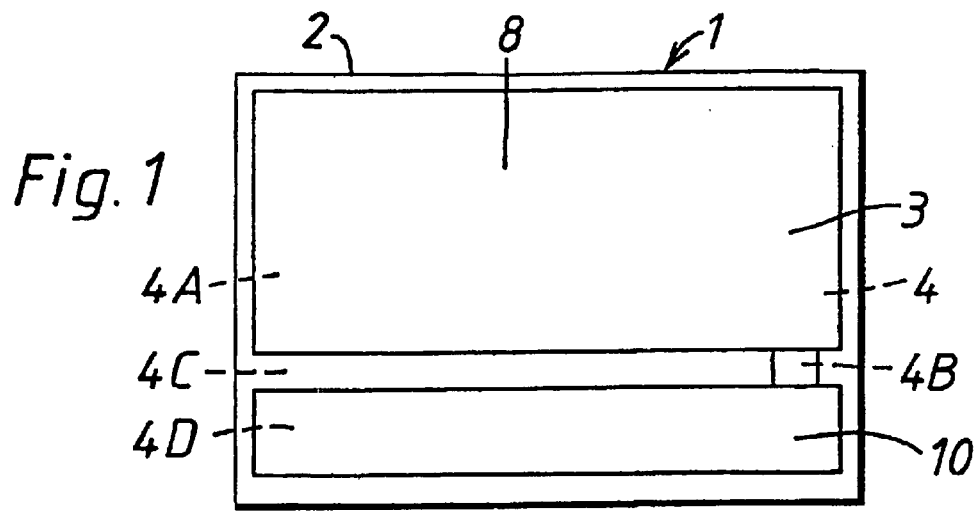
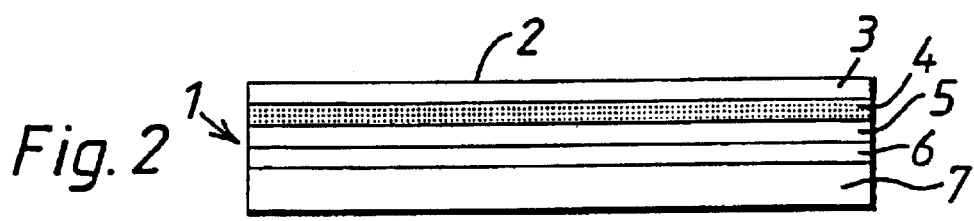
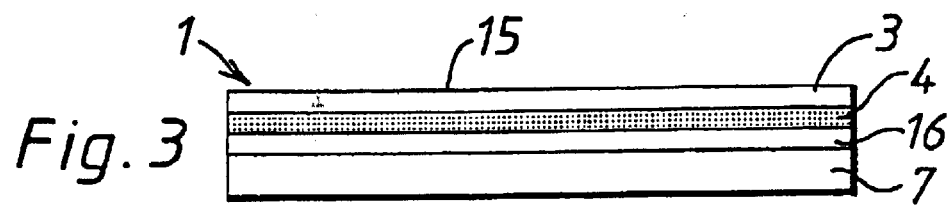
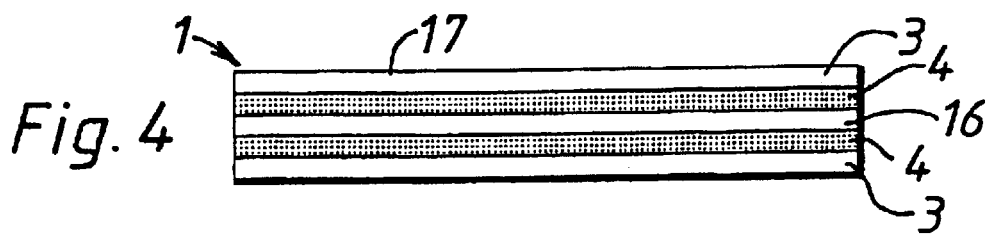
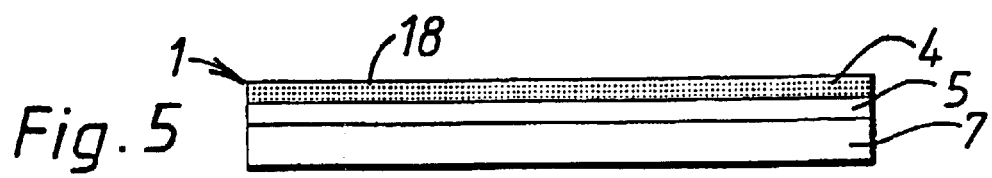

CARD REGISTRATION

| | |
|---|---|
| Insert Card to 1st Stop position | 63 |
| Scanner Reads 3-Digit Matrix | 45 |
| Press Card Selector Key (Alight) | 36 |
| Card Lowers to 2nd Stop Position | 64 |
| 1st Print Sequence Completed | 50 |
| Card Lifts to 1st Stop Position | 63 |
| Scanner Reads 26-Digit Matrix | 45 |
| Press Sensor Key to Register | 34 |
| (Binary Matrix Transmission) | 23 |
| Card Registration Completed | 20 |
| Terminal Display Acceptance | 35 |
| Remove Card from Terminal | 30 |

| | |
|---|---|
| Detach Upper Card Portion | - |
| Insert Card to 1st Stop Position | 63 |
| Card Lowers to 2nd Stop Position | 64 |
| 2nd Print Sequence Completed | 50 |
| Card Lifts to 1st Stop Position | 63 |
| Card Registration Completed | 20 |
| Remove Card from Terminal | 30 |

81

CARD REGISTRATION

| | |
|---|---|
| Insert Card to 1st Stop Position | 63 |
| Scanner Reads 3-Digit Matrix | 45 |
| Press Sensor Key to Register | 34 |
| (Binary Matrix Transmission) | 27 |
| Card Lowers to 2nd Stop Position | 64 |
| Card Registration Completed | 25 |
| Card Lifts to 1st Stop Position | 63 |
| Scanner Reads 38-Digit Matrix | 45 |
| Terminal Display Acceptance | 35 |
| Remove Card from Terminal | 30 |

CARD VALIDATION

| | |
|---|---|
| Insert Card to 1st Stop Position | 63 |
| Scanner Reads 26-Digit Matrix | 45 |
| Press Card Selector Key (Alight) | 36 |
| Key-In Transaction Entry Value | 36 |
| Press Sensor Key to Validate | 34 |
| (Binary Matrix Transmission) | 23 |
| Card Validation Completed | 20 |
| Terminal Display Acceptance | 35 |
| Remove Card from Terminal | 30 |

83

CARD VALIDATION

| | |
|---|---|
| Insert Card to 1st Stop Position | 63 |
| Scanner Reads 38-Digit Matrix | 45 |
| Press Send Key to Validate | 36 |
| (Binary Matrix Transmission) | 27 |
| Card Validation Completed | 25 |
| Terminal Display Acceptance | 35 |
| Remove Card from Terminal | 30 |

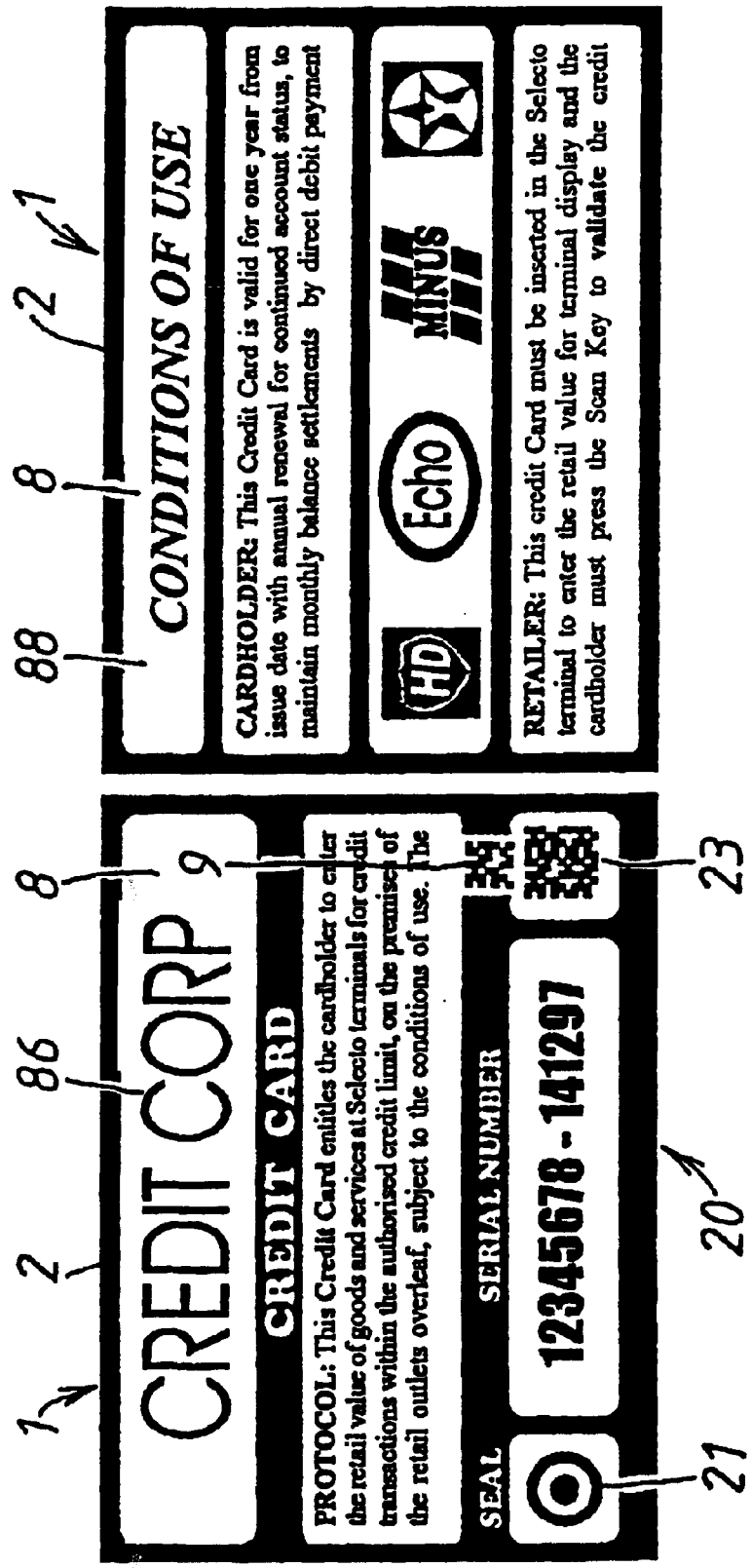
Fig. 17 (contd.)

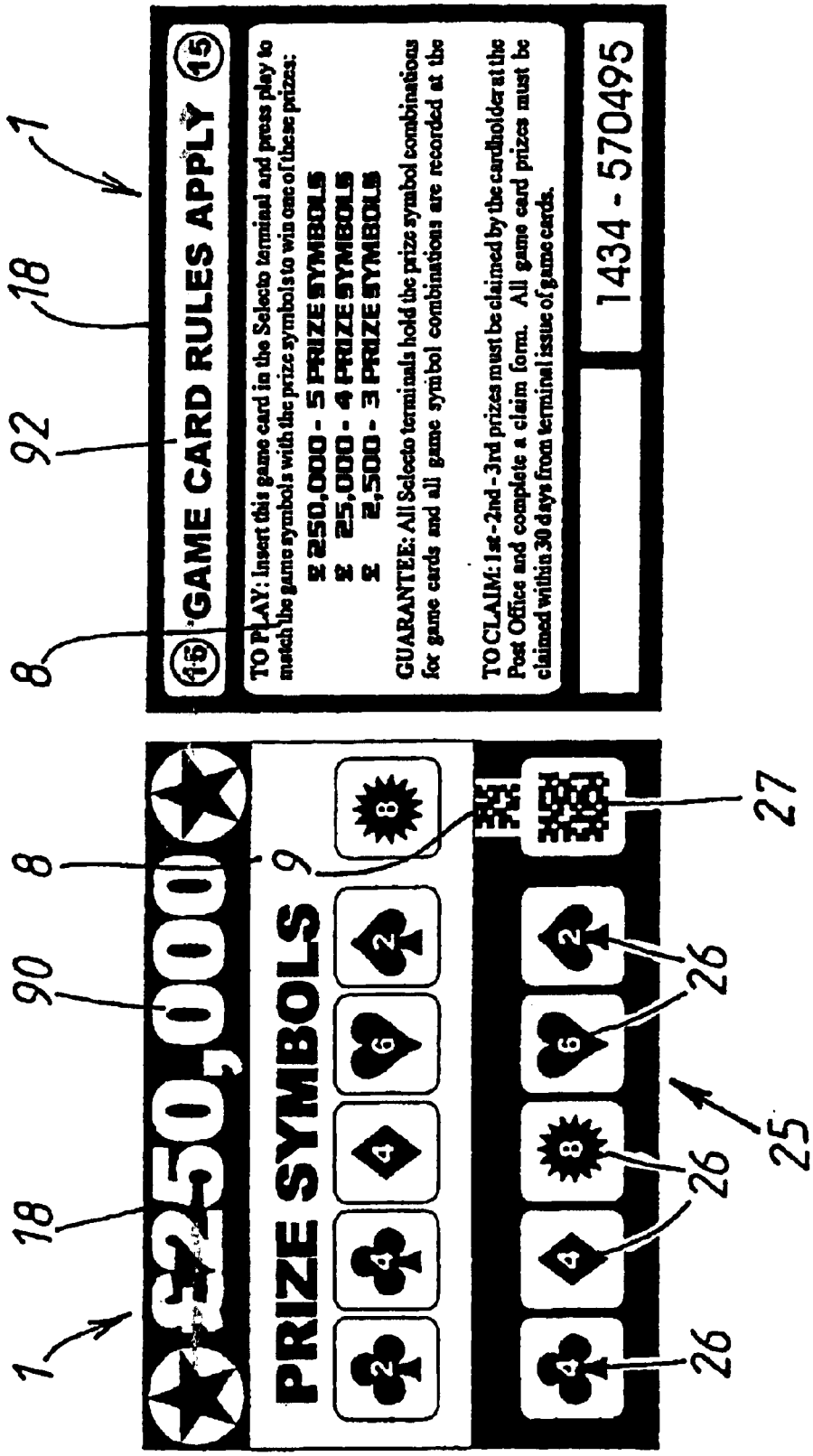

TRANSACTION SYSTEM

This is a continuation of PCT application PCT/GB99/00139, filed Jan. 15, 1999, the entire content of which is hereby incorporated by reference in this application.

This invention relates to a network transaction system including terminals and database servers and a multi-layer transaction card. Preferably the cards are adapted for machine printing and terminal printing of recorded information on different layers, and the terminal is adapted to transmit the recorded information to a database for electronic transactions between terminal and server.

The word "card" is used herein generally, to include any kind of ticket, token or document requiring registration and subsequent validation.

Existing thermal printing materials include thermal sensitive paper for document printing of receipts and letters using dot-line thermal printers.

The main disadvantage of the known materials is that they discolour on exposure to light, resulting in short shelf life, and the thermal image fades, resulting in illegible printed text. Another disadvantage of known materials is that the thermal coating is applied onto the upper surface of the substrate, resulting in low wear resistance for continuous handling. A further disadvantage is that the exposed thermal coating is susceptible to degradation from humidity and temperature.

Printing terminal devices are known, such as facsimile terminals and retail terminals which incorporate printers for thermal printing of letters and receipts using single sheets or continuous rolls of thermal sensitive paper. Standard thermal print-heads consist of heating elements which are 7-dot high×5-dot wide or 8-dot high×5-dot wide to form each character for dot-line printing using a reciprocal print-head or consist of a single row of heating elements for dot-line printing using a stationary print-head.

The main disadvantage of these known devices is that they require complex means to synchronise the paper feed for dot-line printing, requiring geared control means for continuous line by line printing onto thermal paper materials, thereby involving intermittent mechanical and electrical sequences for paper lifting and paper printing. Another disadvantage is that known devices are limited to printing on flexible materials in roll form and not for printing on semi-rigid materials in single card form or fan-fold card form as described herein.

These disadvantages are generally known and considered to be acceptable for producing thermal printed documents using dot-line print-heads assuming that the exposed thermal layer is not exposed to continuous natural or artificial light after terminal printing. One aspect of the present invention aims to avoid or at least to mitigate these disadvantages.

Accordingly a first aspect of the present invention provides a transaction system for executing a registration transaction at a terminal for card issue and recording the registration transaction at a database server for card audit, comprising:
  (a) means for receiving an unissued card in the terminal;
  (b) means for generating a card registration for printing on the card at a terminal for card issue;
  (c) means for generating a card identifier to register the card identifier at a server for card audit; and
  (d) means for transmitting the card identifier between the terminal and server to create a record or data file in a database server to record the registration transaction for card audit.

A second aspect of the present invention provides a transaction system for executing a validation transaction at a terminal for card use and recording the validation transaction at a database server for card audit, comprising:
  (a) means for receiving an issued card in the terminal;
  (b) means for reading a card identifier printed on the card to verify the card identifier at the server for card use; and
  (c) means for transmitting the card identifier between terminal and server to locate a record or data file in the database server to validate the card and record the validation transaction for card audit.

The invention also extends to a transaction system including a network of terminals and database servers, for executing a registration transaction at a terminal for card issue and recording the registration transaction at a database server for card audit, and for executing a validation transaction at the terminal for card use and recording the validation transaction at the database server for card audit using the same card at any database terminal.

A third aspect of the present invention provides a transaction system for executing a registration transaction at a terminal for card issue to a card user, and recording the registration transaction at a database server for card audit, comprising;
  (a) means for receiving an unissued card in the terminal;
  (b) means for generating a card registration for printing on the card at the terminal for card issue;
  (c) means for generating a card identifier to register the card identifier at a server for card audit;
  (d) means for capturing a biometric image in the terminal
  (e) means for generating a user identifier from the biometric image to register the user identifier at the server for card audit; and
  (f) means for transmitting the card identifier and user identifier between terminal and server to create a record or data file in a database server to record the registration transaction for card audit.

A fourth aspect of the present invention provides a transaction system for executing a validation transaction at a terminal for card use and a card user and recording the validation transaction at a database server for card audit, comprising:
  (a) means for receiving an issued card in the terminal;
  (b) means for reading a card identifier from the card to verify the card identifier at the server for card use;
  (c) means for capturing a biometric image in the terminal; and
  (d) means for generating a user identifier from the biometric image to verify the user identifier at the server for card use;
  (e) means for transmitting the card identifier and user identifier between terminal and server to locate a record or data file in a database server to record the validation transaction for card audit.

Preferably the terminal comprises an in-line card pathway with a common entry and exit slot, means for conveying a card between a first stop position and a second stop position and comprising engaged rollers for gripping and transporting the card, and means for holding the card in the second stop position for a predetermined time, means for transporting the card to the first stop position, and means for reading the card and then releasing the card from the slot.

The invention also extends to a card for use in cardholder terminal transactions, comprising a multi-layer material including a layer of thermographic material covered by a barrier layer adapted to prevent fading of a thermographic image formed on the said material.

The multi-layer material preferably comprises of sheet materials such as paper, cardboard, plastic film, metal foils and fabric and incorporates coating materials such as solvent based polymers and inks, rubbers and waxes, with adhesive and thermal properties to prefabricate the multi-layer material in sheet or fan-fold format. The multi-layer material is primarily intended for producing printed documents such as cards, tickets, tokens and forms for terminal issue of registrations to authorise electronic transactions, but not limited to transaction applications, for example, the terminal issue of vehicle excise and driving licence documents, and any form of security document. For simplicity, the multi-layer material will be referred to in card form as a multi-layer card or card.

Depending on the intended purpose, the multi-layer card comprises of two to five layers selected for their individual properties to produce card types for specific use and function. Preferably, the multi-layer card for all card types is designed for machine printing (which may be thermal) on both sides of the card to print the card text and card code, and for terminal printing in the thermal print zone to print a card registration. The machine printing and terminal printing is preferably applied to different layers of the multi-layer card for card description and card registration to provide separate security printing operations, before and after terminal issue.

The multi-layer card may be constructed as a two-part laminate in which an adhesive coating is applied to one side of a substrate sheet to form the lower part, and a barrier coating and thermal coating is applied to an overlay film to form the upper part, and the two parts are adhesive bonded, thereby forming a material with an upper overlay and lower substrate, each coating forming a separate layer contained within the laminate to form a five-layer card. The overlay film, which is transparent, is intended to provide high wear resistance and the barrier layer, which is pastel coloured, is intended to prevent the thermal layer from degrading during use.

The multi-layer card may also be constructed without lamination by first applying the thermal layer to one side of the substrate sheet and then applying the barrier layer directly on top of the thermal layer to form a barrier coated card, ready for machine printing, to print the card text and card code, and define the thermal print zone for card registration. In this example, the overlay film is not used and the thermal and barrier layers exhibit adhesive properties to form a three-layer card. Alternatively the substrate sheet may include temperature sensitive properties to provide a two-layer card.

A further advantage of the multi-layer card is that the same equipment for machine printing of the card text and card code may be used for applying the barrier layer to the overlay film or applying the barrier layer to the thermal layer in a range of colours and densities to enable successive machine printing operations to be used for producing the cards using high speed equipment based on standard letterpress, lithographic or intaglio methods.

One embodiment of the terminal device is intended for cardholder transactions at paydesks and checkouts in retail outlets using multi-layer cards and is a dual function terminal, to print and issue cards for card registration, and to read and verify cards for card validation. Depending on the card description for each card type, consumers buy cards for card registration and use cards for card validation for cardholder transactions in shop and store outlets. The range of card types includes, for example, credit cards and charge cards, lottery and competition cards, voucher and loyalty cards, pension and trust cards, subscription and membership cards, loan and mortgage cards.

When a multi-layer card is inserted in the terminal for card registration, the terminal generates a set of numbers, letters or symbols, for printing within the thermal print zone on the card, and generates a registration code to form a card identifier for transmission in binary to a remote database server to create a record in the database. The card registration is formed on the thermal layer by thermo-chemical reaction to provide a permanent image on the multi-layer card for subsequent terminal insertion to read the registration code to form the card identifier for transmittal to verify the card registration for card validation to complete a cardholder transaction.

In the preferred form of the terminal device the print-head of the terminal printer consists of an array of heating elements in row-orientation for energising each row of heating elements in a pre-determined sequence to form the complete card registration in the thermal print zone when the multi-layer card is inserted in the terminal and held in the stationary position for terminal printing of the card registration.

Preferably the terminal device is such that the multi-layer card can be inserted in the terminal with the overlay film facing the print-head to enable the overlay film to be pressed against the array of heating elements which are selectively energised for heat transference to the thermal layer to produce the thermo-chemical reaction, whereby the thermal layer and barrier layer simultaneously change to black to form a permanent image of the card registration below the overlay film, within the heated areas defined by each heating element. The layers which form the said upper part may be only 80 microns in thickness to enable the card registration to be thermal printed at high speed.

Preferably the terminal device is so arranged that a multi-layer card (of laminate or non-laminate form) is held in a stationary position for terminal printing using a dot-zone or dot-line print-head for thermal printing rather than the method of terminal printing using a dot-line print-head for paper printing and paper lifting cycles currently used in known terminal devices.

Some embodiments of the invention will now be described, by way of example, with reference to the accompanying diagrammatic drawings, in which:

FIG. 1 shows the front face of the multi-layer material in card form.

FIG. 2 is an enlarged cross section of FIG. 1 constructed in one multi-layer variant.

FIG. 3 is an enlarged cross section of FIG. 1 constructed in another multi-layer variant.

FIG. 4 is an enlarged cross section of FIG. 1 constructed in another multi-layer variant.

FIG. 5 is an enlarged cross section of FIG. 1 constructed in another multi-layer variant.

FIG. 15 shows the terminal transaction sequences for the print and issue of card types for card registration.

FIG. 16 shows the terminal transaction sequences for the read and verify of card types for card validation.

Figure 6:
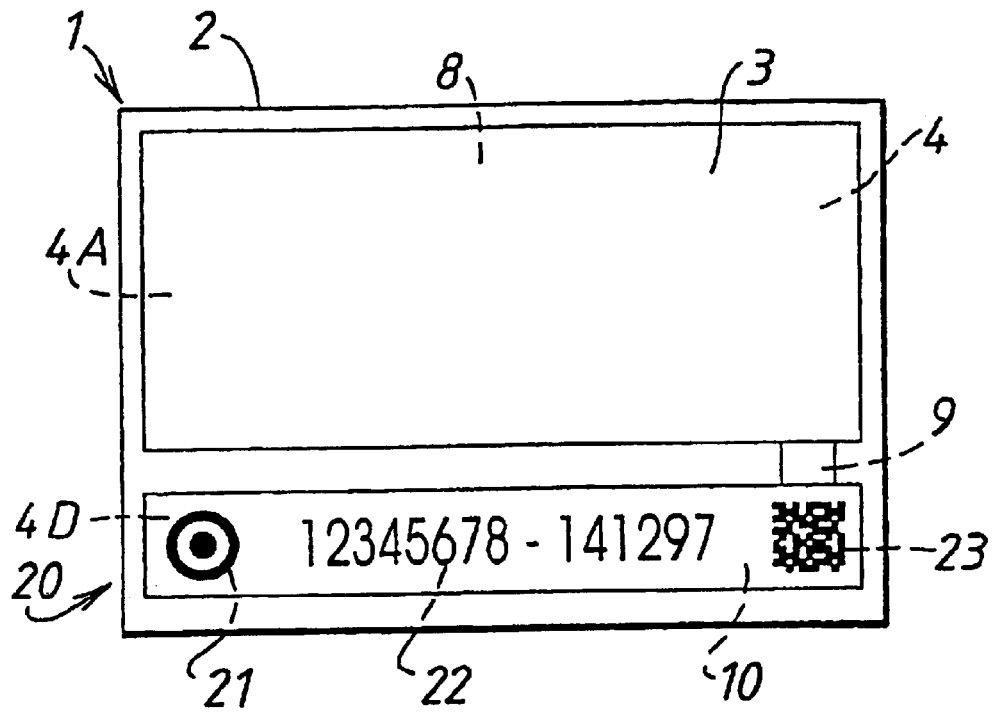
FIG. 6 shows the front face of a multi-layer card with one example of card registration for terminal printing in the thermal print zone.

The following terms are used in the following description of the preferred embodiments with the following meanings:

Network: Terminals which are preferably carrier-linked to servers to form independent networks for automated card transaction, each network comprising different card types for registration and validation transactions.

Database terminal: A terminal incorporating a database for compiling registration data to print on a document (card) and for compiling identifier data to transmit a registration code for the document and to transmit a template for a fingerprint (user).

Database server: A server incorporating a database to receive identifier data from a database terminal and transmit identifier data to a database terminal.

Card identifier: Impersonal information printed on a document in a database terminal to form a registration code for transmission as a discrete card identifier to a database server.

User identifier: personal information captured on a biometric sensor in a database terminal to form a template such as a fingerprint template for transmission as a discrete user identifier to a database server.

Data file: A record of identifier data stored in a database server for matching the registration code of a document (card identifier) and the template of a fingerprint (user identifier), and to record a valid transaction for audit.

FIGS. 1 and 2 show the card 1 constructed of a multi-layer material 2 for machine printing and terminal printing according to the invention, in which the multi-layers 3 to 7 for material 2 cover the front face of card 1.

The overlay 3 is a transparent plastic film with a coloured barrier layer 4 bonded to one side of the overlay 3, and a thermal layer 5 bonded to the barrier layer 4 to form the upper part of the material 2 for lamination to the lower part.

The overlay 3 may comprise any rigid or plasticised plastic film such as terephthalate polyester or polyvinyl acetate in the thickness range 10 to 200 microns. The overlay 3 is surface treated on the underside for machine printing, to print the card text (not shown) in barrier area 4A, print the card code (not shown) in barrier area 4B, print the opaque borders in barrier areas 4C to define the thermal print zone 4D and apply the barrier layer 4 in the thickness range 10 to 50 microns to complete the machine printing operation before the thermal layer 5 is applied in the thickness range 10 to 100 micron as the final production step to complete the upper part of the lamination.

The barrier areas 4A to 4D vary in colour density and resolution. For example, the barrier area 4C is machine printed in 100% colour density and high resolution to provide opaque borders on card 1. The barrier areas 4A and 4B are machine printed with the barrier layer 4 in 50% colour density and high resolution. The barrier area 4D is machine printed with the barrier layer 4 in 50% colour density and medium resolution as this area is used for terminal printing of the card registration on card 1.

Machine printing of the card text and card code, (not shown) and opaque borders (4C), and the barrier layer 4 in barrier areas 4A, 4B and 4D is visible underneath overlay 3.

The thermal layer 5 may comprise any thermal sensitive coating which reacts to temperatures in the 40° C. to 100° C. range to generate the thermo-chemical reaction to form the permanent image from white to black in the thermal print zone 10 for card registration.

The lower part of the material 2 comprises the adhesive layer 6 and substrate 7 for lamination to the upper part of material 2. The adhesive layer 6 may comprise any polymer or rubber such as acrylic and polyurethane for applying to the substrate 7 in the thickness range 10 to 100 microns to provide the contact adhesive layer 6 for laminating the said lower part to the said upper part. The substrate 7 may comprise any printing grade of paper, cardboard or plastic composite in the thickness range 100 to 400 microns to provide a compressed smooth substrate for machine printing, to print the card text of the card type on the side of substrate 7 which is the rear face of card 1.

A wax or silicone backing sheet may be placed on top of the adhesive layer 6 for substrate 7 storage or delivery of the said lower part for subsequent laminating to the said upper part.

It will be understood that the material 2 in this example consists of an upper part made up of the three layers (overlay 3, barrier 4 and thermal 5), and of a lower part made up of the two layers (adhesive 6 and substrate 7), thus forming a five layer material 2 on final lamination.

FIG. 3 shows the material 15 variant for card 1 in FIG. 1 whereby a four layer construction is produced by using an adhesive-thermal coating to provide an adhesive-thermal layer 16 for laminating the upper part and lower part together. In this example, the material 15 is designed to provide a thinner laminate card 1.

FIG. 4 shows the material 17 variant for card 1 in FIG. 1 whereby a five layer construction is produced without substrate 7 by using two overlays 3, two barrier layers 4 and one adhesive-thermal layer 16, for laminating the upper part and lower part together. In this example, the material 17 is designed to provide an all plastic laminate for card 1.

FIG. 5 shows the material 18 variant for card 1 in FIG. 1 whereby a three layer construction is produced by using the barrier layer 4 as the card surface instead of overlay 3. In this example, the material 18 is designed as a one part material 18 requiring no adhesive layer 6 as the barrier layer 4 is applied and adhered direct to the thermal layer 5 which is applied and adhered to the substrate 7, to provide a low cost non-laminate card 1.

FIG. 6 shows the front face of card 1 with a card text zone 8 and card code zone 9 for machine printing the card text and card code (not shown), and shows by way of example, a card registration 20 formed in the thermal print zone 10 after terminal printing, to provide a laminate variant for card 1. This card registration is designed for a credit card 1 or trust card 1.

The card registration 20 consists of, from left to right, the registration logo 21 the registration mark 22 and registration code 23 which are permanent images formed by the terminal printer 50 which will be described later.

The logo 21 is generated by the terminal computer to identify the card-issuer and authenticate terminal printing of the card registration 20 for cardholder transaction subject to the terms and conditions of use granted by the card-issuer to the cardholder. The logo 21 acts as a security seal formed as a permanent image in the thermal print zone 10.

The mark 22 is randomly generated by the terminal computer to form a 14 digit registration mark 22 to represent the card-issuer serial number which includes the 6 digit card issue date. The terminal 30 is preloaded with a serial block of 8 digit numbers for 5000 cardholders and a serial block of 3 digit numbers for 1000 card types to form a common pool of numbers for each card type and provide 11 digit serial numbers with five million combinations per terminal. The 8 digit serial number forms part of the 14 digit registration mark 22 (the 6 digit issue date forms the other part) for terminal printing in the thermal print zone 10.

The code 23 is shown as a data matrix symbology and generated by the terminal computer to compile the card registration 20 as the point of origin. The code 23 consists of the card type number (3 digit) in the card code zone 9, the terminal number (5 digit), the registration mark 22 (14 digit), and the issue time (4 digit) to form a 26 digit data matrix as the code 23 for terminal printing in the thermal print zone 10. The terminal 30 generates the code 23 to form the card identifier for transmission in binary to the card type server for database entry to record the card registration 20 for card 1.

It will be understood that the card registration 20 is recorded in the code 23 on card 1 and in the database of the card type server. As a consequence the card 1 can now be used for cardholder transactions at any terminal 30 as the code 23 is read by the terminal scanner 45 and transmitted for facsimile matching at the database for card validation.

Figure 7:
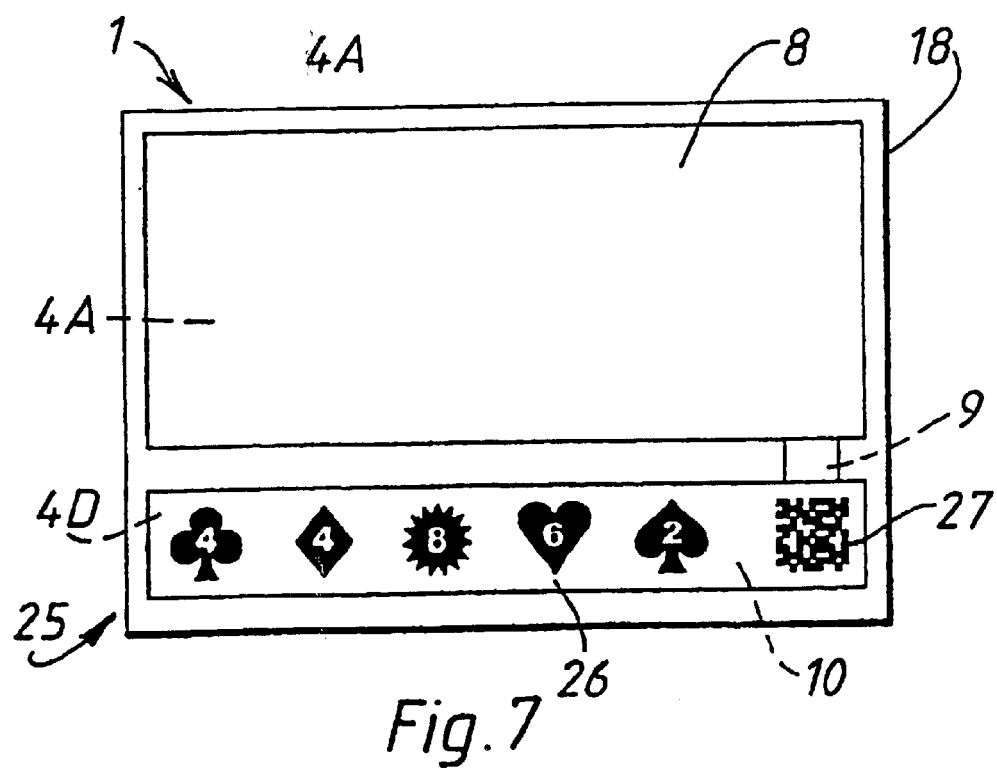
FIG. 7 shows the front face of a multi-layer card with another example of card registration for terminal printing in the thermal print zone.

FIG. 7 shows the front face of card 1 of identical layout as described above, except that the card registration mark 25 consists of a registration mark 26 and registration code 27 formed in the thermal print zone 10 after terminal printing to provide or a low cost non laminate variant for card 1. This card registration is designed for a lottery card 1.

The mark 26 comprises of numbered symbols which are generated by the terminal computer to form a set of five symbols to represent a lottery game-line for matching with the lottery prize-line which is machine printed in the barrier area 4A (not shown) on card 1. The terminal 30 is also preloaded with the numbers and symbols to form a common pool of symbols for terminal printing in the thermal print zone 10.

The code 27 is shown as a data matrix symbology generated by the terminal computer to compile the card registration 25 as the point of origin. The code 27 consists of the card type number (3 digit) in the card code zone 9, the terminal number (5 digits), the registration mark 26 (20 digits), the issue date (6 digits) and the issue time (4 digits) to form a 38 digit data matrix as the code 27 for terminal printing in the thermal print zone 10. In this case, the terminal 30 receives the code 27 as the card identifier which is transmitted in binary from the card type server for terminal printing of the registration mark 26 and code 27 to form the card registration 25 on card 1.

Figure 8:
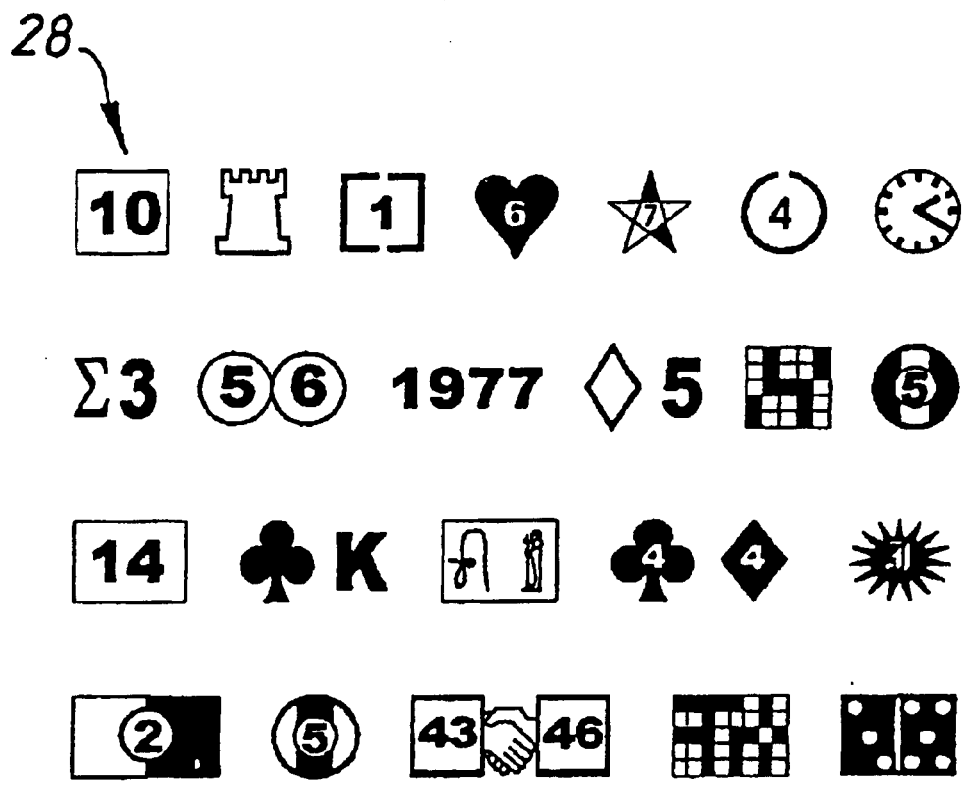
FIG. 8 shows a range of number and symbol combinations for card registration, for terminal printing in the thermal print zone.

FIG. 8 shows a typical range of registration markings 28 which are randomly generated by the terminal computer to form different combinations for different card types as exampled in FIG. 7. It will be understood that the permutations for forming sets of registration marks 28 based on the illustrated numbers, letters and symbols in any combination, for different card types, are to an order of magnitude.

The terminal 30 includes a terminal main board 68 in the front compartment 67 with processor, RAM, hard disk and modem, power supply and standby battery, and associated interfaces to operate the printer 50, scanner 45, keyboard 36, display 35 and sensor 34, and to transmit all registration codes (for example 23 and 27) to and from the carrier-linked servers for facsimile matching of card registrations (for example 20 and 25) to verify any card registration for card validation to complete any cardholder transaction.

Figure 9:
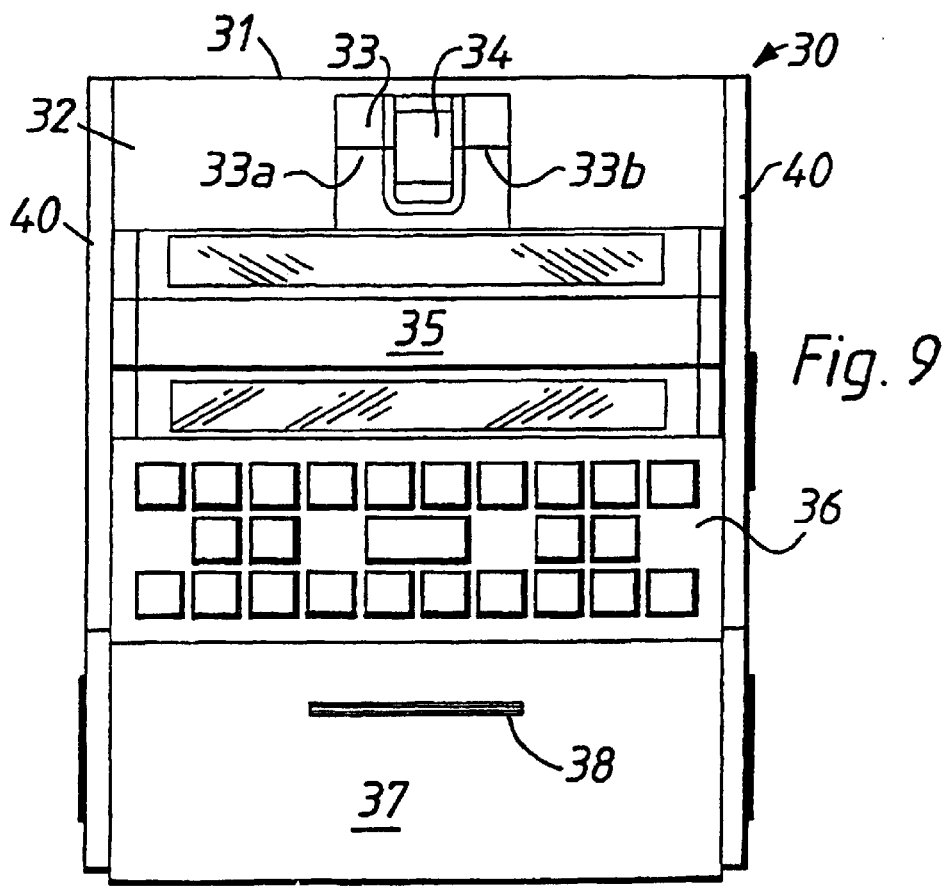
FIG. 9 is a plan view of the terminal device for cardholder transactions.
Figure 10:
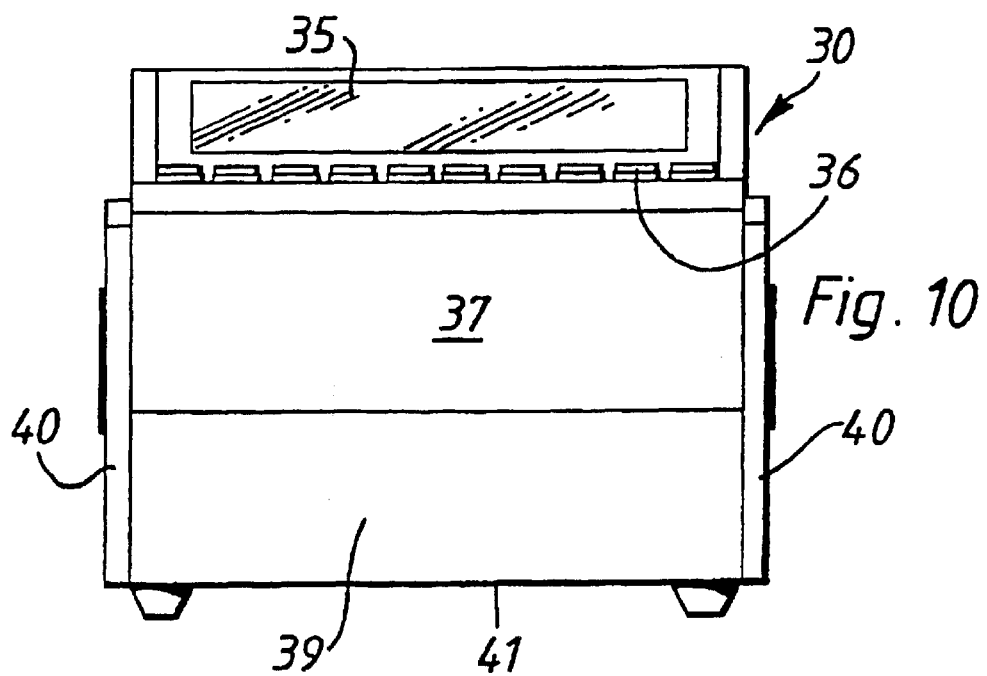
FIG. 10 is a rear view of the terminal device for cardholder transactions.

FIGS. 9 and 10 show the terminal 30 in plan and rear views and comprises of a front panel 31 and top panel 32 for mounting the sensor surround 33 fitted with the terminal sensor 34. Adjacent to the sensor 34 is the terminal display 35 which is fitted with two screens for viewing by the cardholder and terminal attendant. Adjacent to the display 35 is the terminal keyboard 36 for attendant operation in retail shops and stores, to serve cardholders at the point of sale.

Adjacent to the keyboard 36 is the access cover 37 for service access to the rear compartment 44, delimited by internal wall 42, rear panel 39, side panels 40 and base 41 to contain the terminal scanner 45 and terminal printer 50 for terminal printing of card 1. The access cover 37 incorporates the card slot 38 to insert card 1 for card registrations and card validations.

The terminal 30 is therefore encased by the front panel 31, top panel 32, display 35, keyboard 36, access cover 37, rear panel 39, side panels 40 and base 41, to provide a self contained terminal 30 for counter placement in retail outlets for multi-card transactions.

Figure 11:
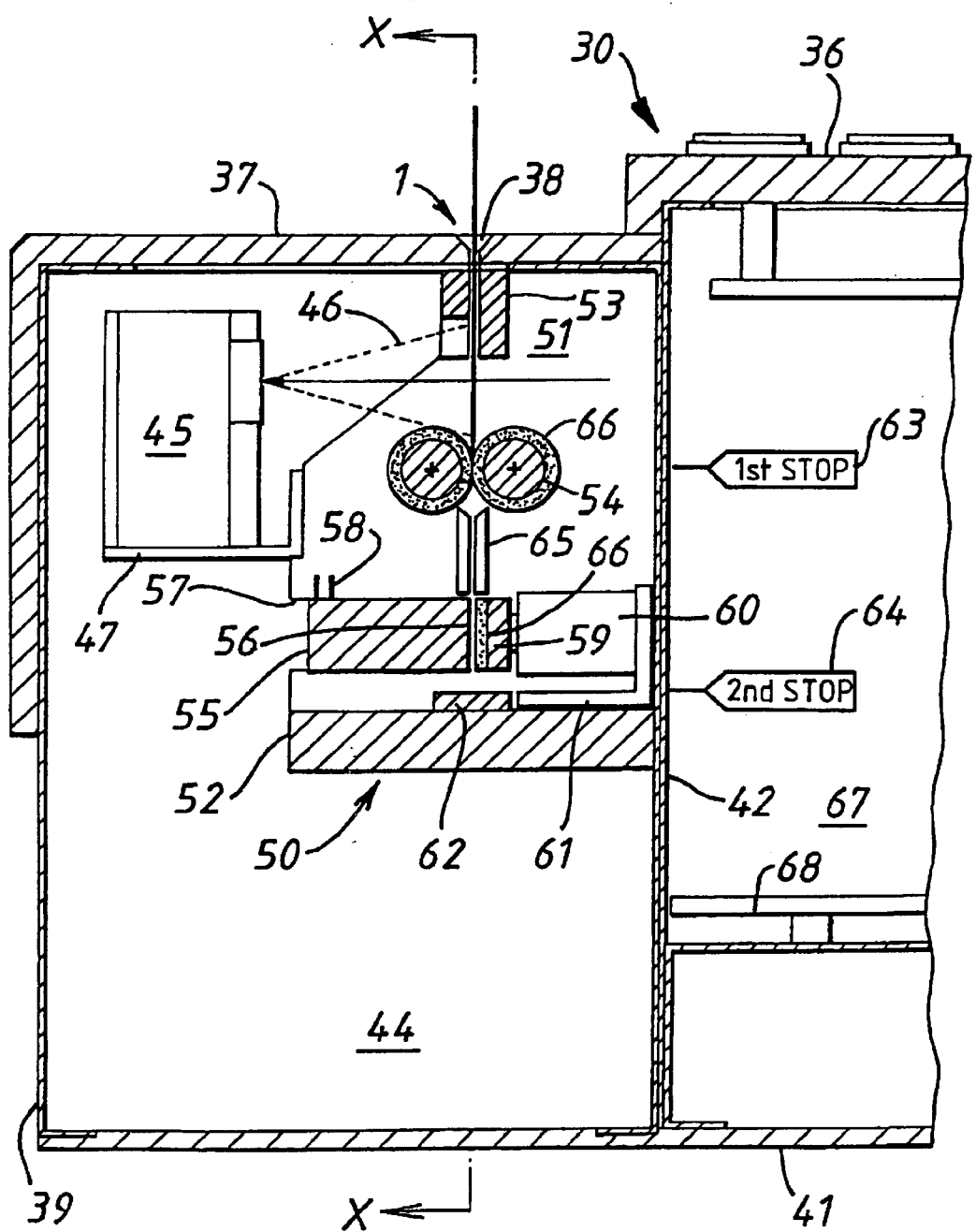
FIG. 11 is a side elevation in part cross section of the terminal printer and scanner in the rear section of the terminal device.
Figure 12:
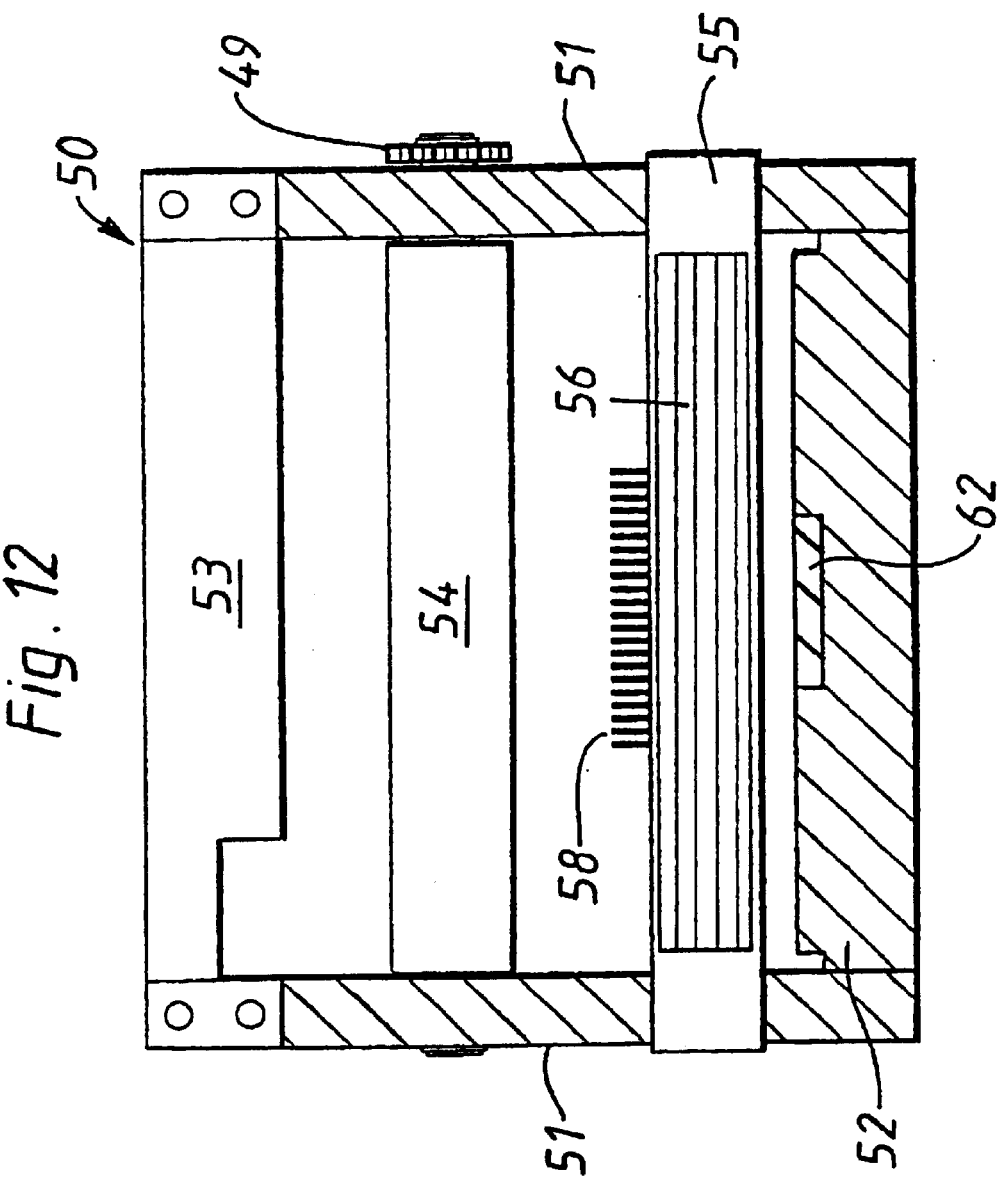
FIG. 12 is a front view of the dot-zone print head shown in view X—X of FIG. 11.

FIGS. 11 and 12 show the position of the scanner 45 and printer 50 housed in the rear compartment 44 of the terminal 30. The scanner 45 is rigidly supported on brackets 47 connected to the two vertical side plates 51 of the printer 50 shown in part cross section. The two side plates 51 are rigidly mounted to the internal wall 42 to position and align the printer 50 and scanner 45 with the card slot 38 in the access cover 37 for manual insertion of card 1 in the terminal 30.

The scanner 45 incorporates a video camera and emits a beam 46 with processor and output electronics (not shown) to read data matrix symbology. The scanner 45 is therefore aligned to read the data matrix (not shown) in the card code zone 9 on insertion of card 1 to identify the card type number (3 digits), and read the data matrix in the thermal print zone 10 after terminal printing of the registration code 23 and 27 on card 1 prior to card removal from the terminal 30.

The scanner 45 is positioned to read the data matrix in the code zone 9 and print zone 10 at the 1st stop position 63 for card identification, card registration and card validation to provide mechanical and electrical simplicity using one scanning and printing system for all terminals 30.

The terminal printer 50 comprises two vertical side plates 51 which are spaced apart to allow for the card 1 to pass between each vertical side plate 51 for guidance. The two vertical side plates 51 are rigidly connected at the top by the transverse bridge guide 53 and at the bottom by the base plate 52. The bridge guide 53 is an extended card slot to self-align the card 1 for vertical insertion and removal of card 1.

Positioned below the bridge guide 53 are the two transverse nip-rollers 54 mounted in bearings at each end in the two vertical side plates 51 for drive rotation by a geared electric motor (not shown) mounted on the other side of one of the side plates 51. The motorised nip-rollers 54 contra-rotate and are synchronised by meshed gears 49 to ensure equal rotation when the card 1 is transported between the nip-rollers 54 and card guides 65, either downwards by inward rotation or upwards by outward rotation between the 1st stop position 63 and the 2nd stop position 64.

The control means to start and stop the motorised nip-rollers 54 is activated by the keyboard 36 to instruct descent of card 1 from the 1st stop position 63 to the 2nd stop position 64 and deactivated by the sensor 62. The control means to start and stop the motorised nip-rollers 54 is then activated by the solenoid 60 (retract) to instruct ascent of card 1 from the 2nd stop position 64 to the 1st stop position 63 and deactivated by a timer (not shown). The 2nd stop position 64 is used for terminal printing.

Positioned below the motorised nip rollers 54 is the transverse print head 55 rigidly mounted in the side slots 57 of the two vertical side plates 51 with the dot-zone array 56 positioned opposite the resilient facing 66 bonded to the displaceable flat platen 59 which is connected to the actuator bar of solenoid 60. The solenoid 60 is connected to bracket 61 which is rigidly mounted on base plate 52.

The control means (not shown) for operating the print head 55 is electronically connected to the pin connector 58 of the print head 55. The heating elements are contained within the body of the print head 55 and visible in FIG. 12 through section view X—X as the dot-zone array 56. The dot-zone array 56 of the print head 55 consists of rows of miniature heating elements, each capable of independent operation by applying electrically pulsed energy in programmable row by row sequence by software means known per se.

The dot-zone array 56 for a thermal print area of 8 mm high×80 mm wide consists of 40,960 heating elements based on 8 dots per millimeter to achieve high resolution images using dot-zone thermal printing. In operation, the card 1 is pressed against the dot-zone array 56 by the displaceable flat platen 59 in the stationary position during terminal printing, and the energy pulse of each heating element transfers heat to the thermal layer 5 of card 1 to form permanent images made up of individual dots by thermo-chemical reaction.

It will be understood that the thermal print zone 10 on card 1 is designed to locate in the printer 50 at the 2nd stop position 64 to ensure that thermal print zone 10 is positioned between the print head 55 and the displaceable flat platen 59 for terminal printing of any card registration, for example 20 and 25, on card 1. Furthermore, when the displaceable flat platen 59 is retracted, a vertical pathway is provided for the card 1 to descend to the 2nd stop position 64 for terminal printing.

Figure 13:
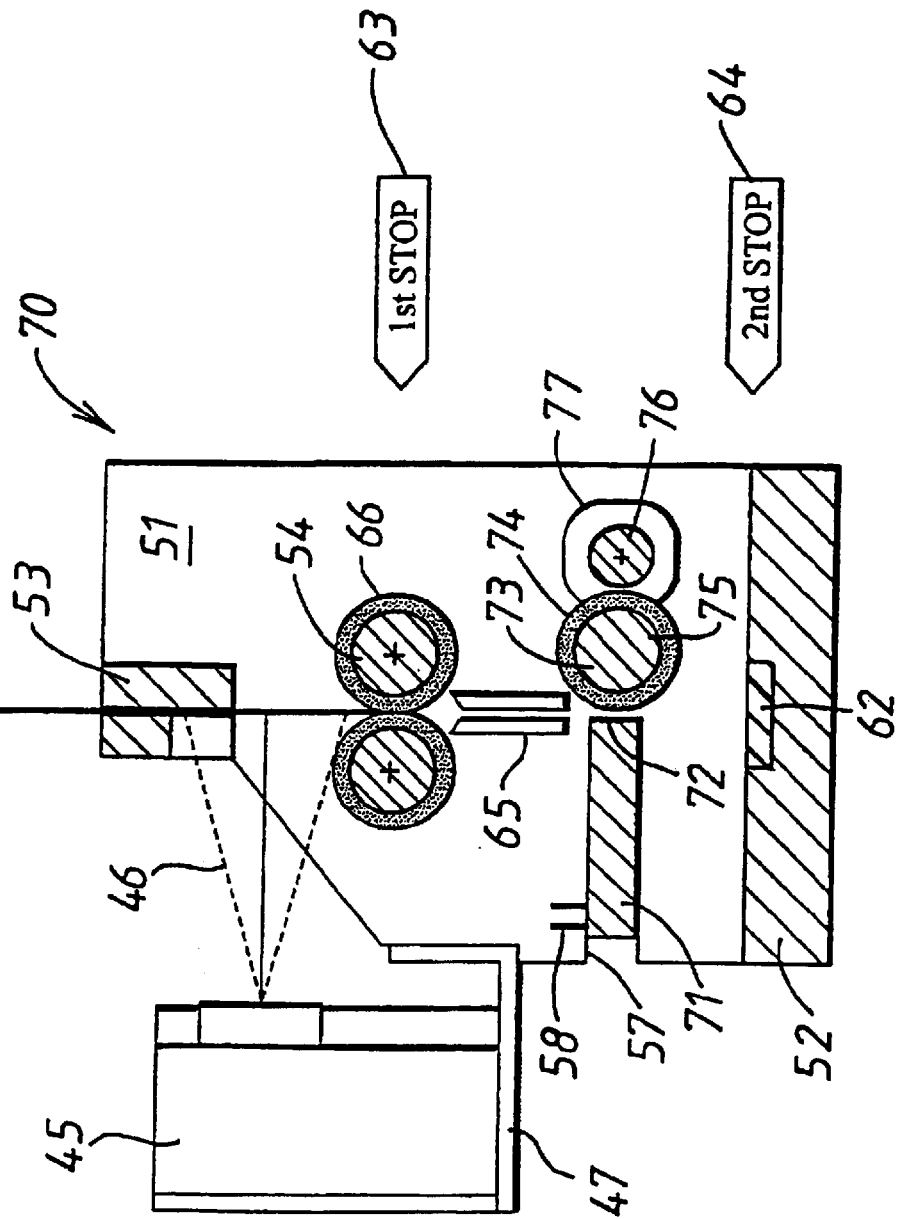
FIG. 13 is a side elevation in part cross section of an alternative terminal printer.

FIG. 13 shows an alternative terminal printer 70 of a similar construction to the printer 50 except that the print head 71 incorporates a dot-line array 72, for example 0.1 mm high×80 mm wide, and displaceable circular platen 73 with a drive shaft 75 mounted in spring biased slide bearings (not shown) housed in the two vertical side plates 51 for sequential reciprocation by the motorised camshaft 76 and sequential rotation by the nip-rollers 54, in operation, the circular platen 73 moves backwards and forwards for close-open motion caused by the spaced apart end cams 77 on the motorised camshaft 76 engaging with the drive shaft 75 of the circular platen 73. The circular platen 73 includes a resilient facing 74 and the drive shaft 75 rotates in unison with the nip-rollers 54 by meshed gear interconnection (not shown) on the outside of one of the vertical side plates 51 during the card lifting sequence in the open position.

In operation, the close-open cycles are mechanically synchronised for card printing in the close position and card lifting in the open position. As a consequence, the circular platen 73 presses the card 1 against the dot-line array 72 in the close position for card printing, and the circular platen 73 releases the card 1 in the open position for card lifting by the nip-rollers 54 to complete each close-open cycle.

The resilient facing 74 of the circular platen 73 is made to deform on contact with card 1 to increase the contact area and therefore the pressing area against the card 1 in the close position which is greater than the print area of the dot-line array 72. The nip-rollers 54 in unison with the circular platen 73, partially rotate to lift card 1 and revolve platen 73 in dot-line increments in the open position.

It will be understood that the heating elements of the dot-line array 72 are also timed for energy pulsing in the closed position to transfer heat to the thermal layer 5 of card 1 to form permanent images made up of individual dots for each dot-line print and lift cycle. The dot-line array 72 has a smaller print area, for example, 0.1 mm high×80 mm wide, requiring less heating elements whilst maintaining mechanical and electrical simplicity like terminal printer 50.

Figure 14:
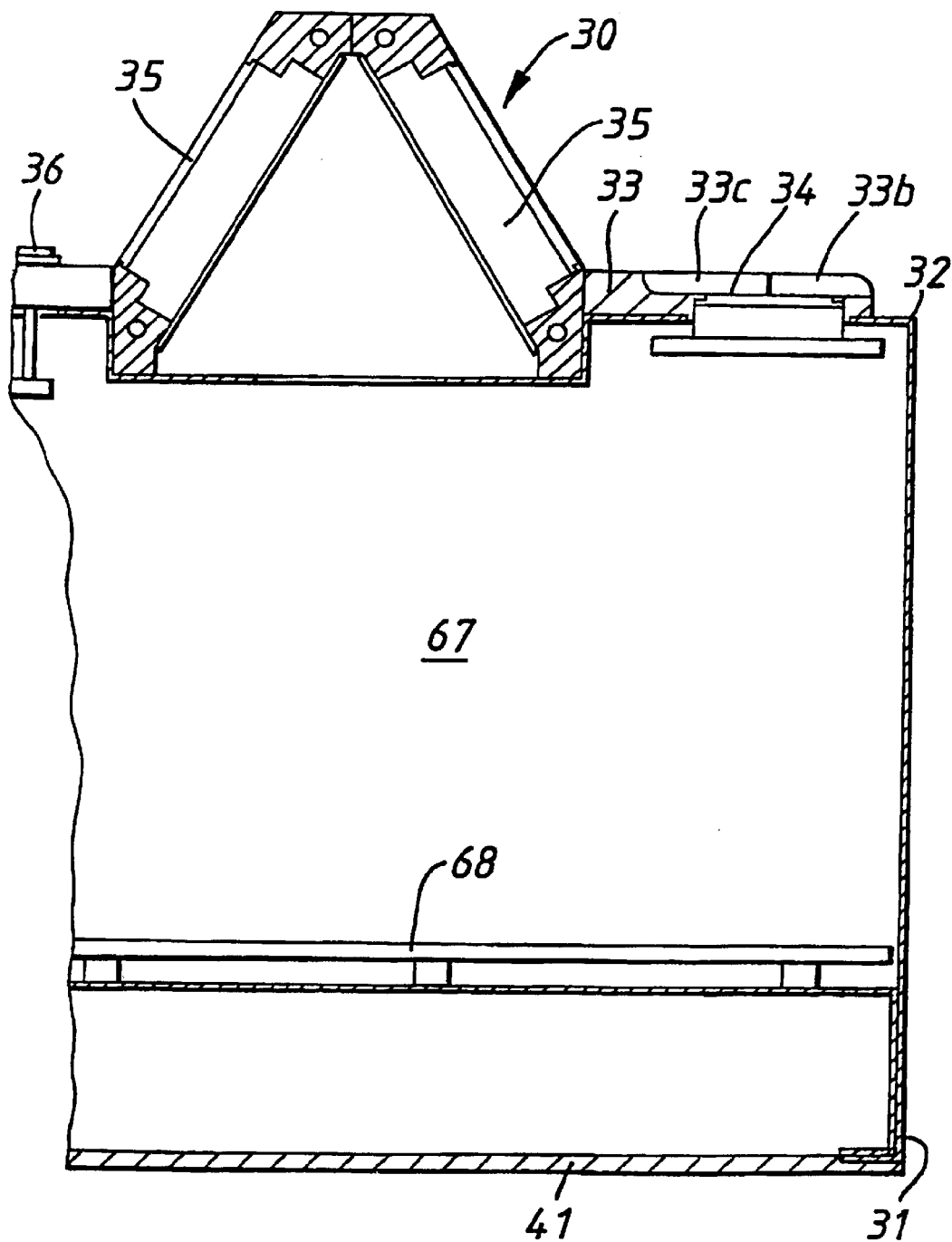
FIG. 14 is a side elevation in part cross section of the terminal sensor and display in the front section of the terminal device.

FIG. 14 shows the position of the terminal sensor 34 on the top panel 32 of the terminal 30. The sensor 34 is mounted to the underside of the moulded surround 33 with the face of the sensor 34 flush fitted in a guide recess 33c of the surround 33 for finger placement. The surround 33 includes register lines 33a, 33b to provide visual guides for placing any finger in one position on the sensor 34 by aligning the cuticle on the fingernail side of the finger with the register lines 33a, 33b and simultaneously positioning the finger in the centre of the recess 33c. The register lines 33a, 33b and recess centre position represent an imaginary X and Y axes on the face of the sensor 34 (which is therefore not shown). The sensor 34 is used for capturing "live-scan" fingerprint images to generate user identifiers for transmission in binary to the carrier-linked servers for database entry to store personal fingerprint templates in addition to the registration 20 for card type facsimile matching at the server end.

It will be understood that the registration code 23 and fingerprint template are generated by the terminal software to form a two part byte stream comprising a card identifier and user identifier for binary transmission, and orientated with the registration code 23 acting as a pathfinder for call routing to the correct card type server and locate the correct registration code 23 stored in the database for facsimile matching of two constants 23. As a consequence, the live-scan fingerprint template and stored fingerprint template can be compared to accept or reject the user of card 1 at any terminal 30. (It should be noted that live-scan fingerprint templates are variable due to daily biological changes).

Situated in the front compartment 67 of the terminal 30, delimited by internal wall 42, side panels 40, front panel 31, top panel 32, and base 41 is the mainboard 68 with processor (not shown) and associated elements for operating the terminal 30 in conjunction with the keyboard 36 and dual display 35 mounted on the top panel 32. The dual display 35 incorporates two display screens for viewing by the terminal attendant and cardholder at the same time for terminal transactions.

Figure 17:
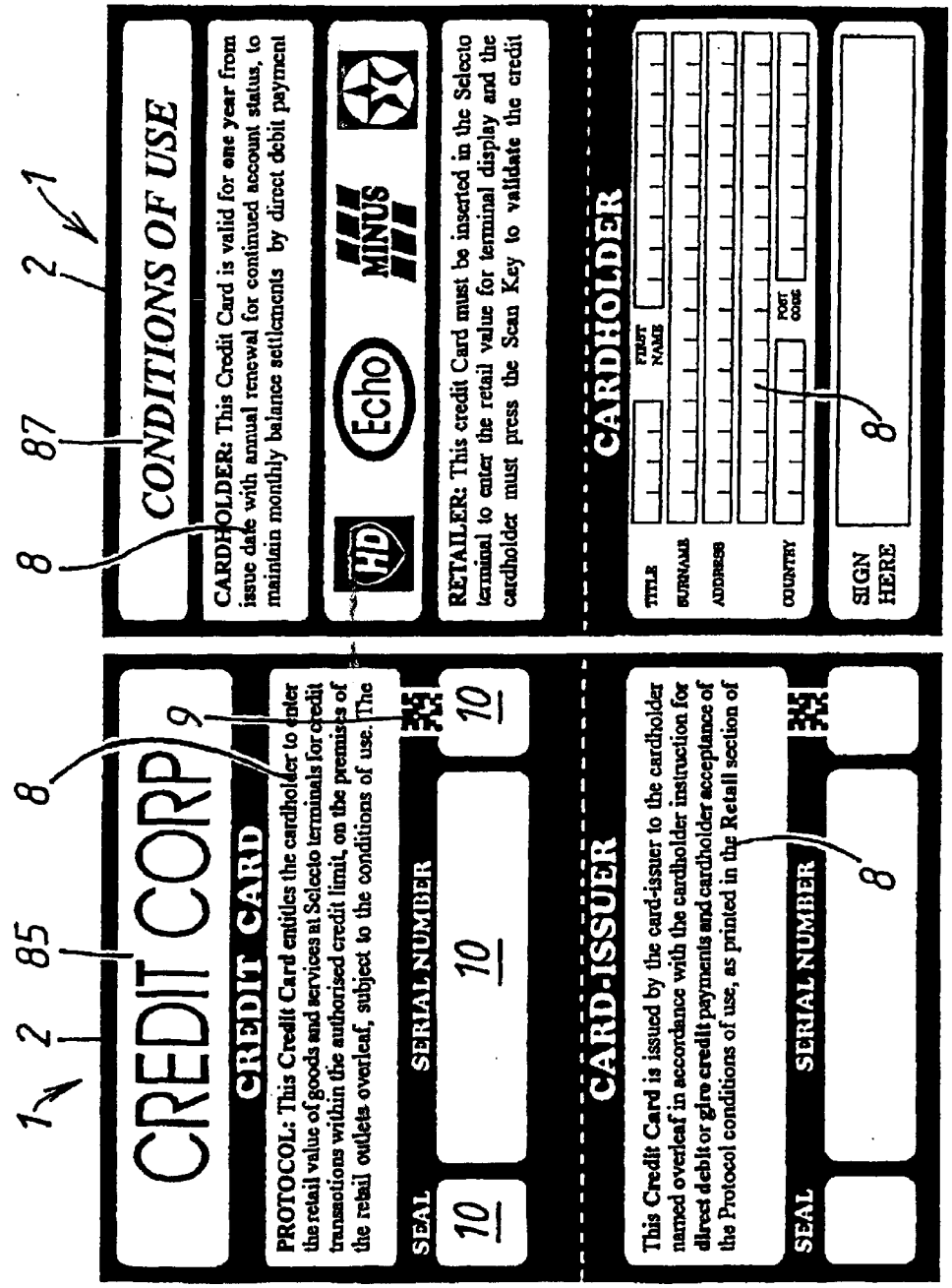
FIG. 17 shows the front and rear face of a credit card for terminal transaction before and after card registration.
Figure 18:
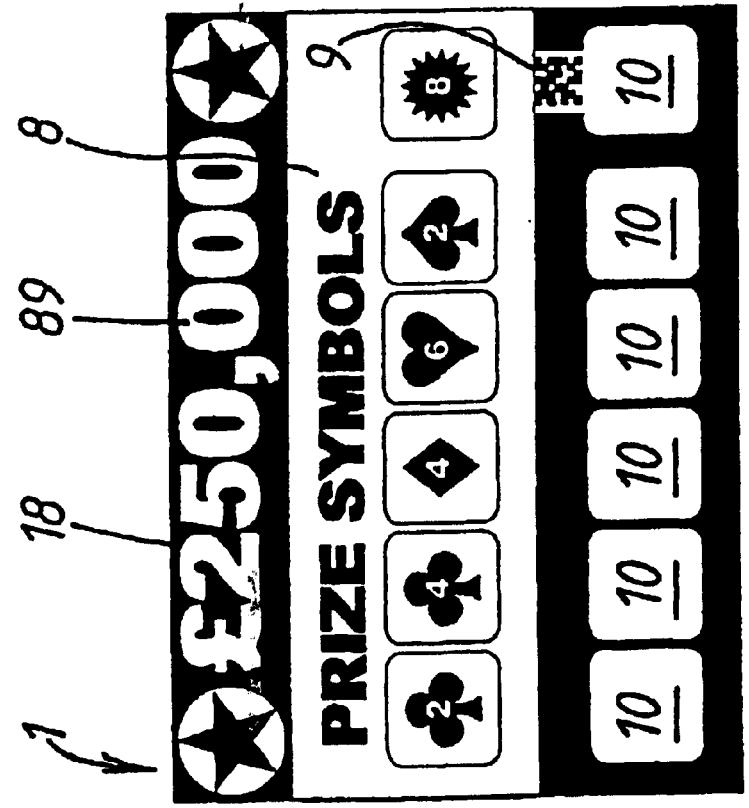
FIG. 18 shows the front and rear face of a lottery card for terminal transaction before and after card registration.

FIG. 15 lists the terminal operation sequences with reference numbers to print and issue the card registration 20 on a credit card 1, and to print and issue the card registration 25 on a lottery card 1, which are further illustrated in FIGS. 17 and 18 for additional explanation.

The terminal sequence 80 for credit card 1 is a double print operation as the credit card 1 is a two part card with a perforation for separating the card 1 into two parts whereby the upper part is handed to the card holder and the lower part is retained by the retailer after terminal issue. As a consequence, the lower part is first inserted in the terminal 30 for terminal printing and removal for separation, and the upper part is then inserted in the terminal 30 for terminal printing and removal.

The terminal sequence 81 for lottery card 1 is a single print operation as the lottery card 1 is a one part card. As a consequence, the card 1 is inserted in the terminal 30 for terminal printing and removal. This card 1 is designed for registered, licensed and promotion lotteries and is categorised as a prize-line lottery system. FIG. 18 shows a lottery card 1 for free prize promotions.

FIG. 16 lists the terminal operation sequences with reference numbers to read and verify the card registration 20 on a credit card 1 for card validation and read and verify the card registration 25 on a lottery card 1 for card validation, which are further illustrated in FIGS. 17 and 18 for additional explanation.

The terminal sequence 82 for credit card 1 is applicable for card validation at the terminal 30 with cardholder identification for card validation. As a consequence, the sensor 34 is pressed by the cardholder when the credit card 1 is inserted into the terminal 30 to locate the card registration 20 by facsimile matching and verify the cardholder identity by template matching for card validation and credit transaction at the database server.

The terminal sequence 83 for lottery card 1 is applicable for card validation at the terminal 30 without cardholder identification. As a consequence, the sensor 34 is not used for cardholder identification and the lottery card 1 is inserted into the terminal 30 to locate the card registration 25 by facsimile matching for card validation and prize award at the database server.

FIG. 17 illustrates the credit card 1 based on the multilayer material 2 before and after terminal printing of the card registration 20 in the two part thermal print zone 10.

The credit card 1 describes the card text in the card text zones 8 on the front face 85, 86, and on the rear face 87, 88, which are machine printed during card 1 production. The thermal print zone 10 is shown sub-divided for terminal printing of the card registration 20. The upper part of credit card 1 for card holder use, after terminal printing, shows the logo 21, mark 22 and code 23, to form the card registration 20 as permanent images on the barrier layer 4 which is underneath the overlay 3 as shown in FIG. 2.

FIG. 18 illustrates the lottery card 1 based on the multilayer material 18 before and after terminal printing of the card registration 25 in the one part thermal print zone 10.

The lottery card 1 describes the card text in the card text zones 8 on the front face 89, 90, and on the rear face 91, 92, which are machine printed during card 1 production. The thermal print zone 10 is shown sub-divided for terminal printing of the card registration 25. The lottery card 1, after terminal printing, shows the mark 26 (five symbols) and code 27 to form the card registration 25 as permanent images on the barrier layer 4 as shown in FIG. 5.

A terminal transaction for card registration will now be described for a credit card 1 as illustrated in FIG. 17.

The two part card 1 is manually inserted in the terminal 30 at card slot 38 to the 1st stop position 63 and the scanner 45 reads the 3 digit matrix in the code zone 9 to illuminate the card selector key on the keyboard 36. The key is pressed which activates the motor to contra-rotate the nip-rollers 54 inwardly and thereby grip each side of card 1 to lower the card 1 between the card guides 65 and between the print head 55 and flat platen 59, whereupon the lower edge of card 1 makes contact with the sensor 62 at the 2nd stop position 64 to stop the motor driving the nip-rollers 54, and actuate the solenoid 60 to extend the flat platen 59 to press the card 1 against the dot-zone array 56, whereupon the print head 55 is energised for terminal printing in the thermal print zone 10 of card 1 which is now constantly pressed against the dot-zone array 56.

The print head 55 is controlled by the software to generate the energy pulses in row orientation to form lines of dots in sequential order by heat transference from the energised heating elements to the thermal layer 5 to cause the thermochemical reaction, whereby the thermal layer 5 discolours (black) at the points of heat contact which in turn discolours (black) the barrier layer 4 to produce a permanent image (in colour contrast to the original barrier layer 4) made up of individual dots to form the card registration 20 in the thermal print zone 10 of card 1. The permanent image of the card registration 20 is now formed underneath the overlay 3.

The solenoid 60 is activated when the print head 55 completes the printing sequences and retracts the flat platen 59, whereupon the motor contra-rotates the nip rollers 54 outwardly to lift card 1 to the 1st stop position 63 and stop, and thereby activate the scanner 45 to read the (26 digit) data matrix code 23 to generate the code 23 bytestream to form the card identifier. The terminal display 35 now requests the cardholder to press the sensor 34 to generate the bytestream for the fingerprint template to form the user identifier, whereupon the terminal 30 orientates the two part bytestream, card identifier followed by the user identifier for binary transmission to the card type server to create a record or datafile in the database and receive display 35 acceptance, for the card 1 to be removed from the terminal 30.

The card 1 is a two part card and therefore has two thermal print zones 10. The lower part is now detached and the upper part is inserted in the terminal 30 for terminal printing at the 2nd stop position 64 and terminal removal as described above for duplicate printing only. The upper part of card 1 is handed to the cardholder ready for use.

A terminal transaction for card validation will now be described for the credit card 1 as illustrated in FIG. 17.

The one part credit card 1 is manually inserted in the terminal 30 at the card slot 38 to the 1st stop position 63 and the scanner 45 reads the (26 digit) data matrix code 23 in the thermal print zone 10 to illuminate the card selector key on the keyboard 36.

The terminal attendant keys-in the transaction value for terminal display 35 and requests the cardholder to press the sensor 34. The terminal 30 generates and orientates the three part bytestream, card identifier followed by the user identifier and then transaction value for binary transmission to the card type server to locate the record or datafile in the database by facsimile matching and verify the user identifier by template matching to enter the transaction value for credit transaction and receive display 35 acceptance (or rejection), for the card 1 to be removed from the terminal 30.

The terminal transactions for a lottery card 1 as illustrated in FIG. 18 use similar registration and validation procedures except that the lottery card 1 is a one part card and therefore has one thermal print zone 10 for terminal printing and the sensor 34 is not used for generating a user identifier and therefore no template matching is required.

The terminal transactions described above are completed within 15 seconds as the terminal 30 has continuous on-line connection to the computer centre for call routing to the card type servers. It will be understood that some functions are subject to pre-settable timing and calibration, including removal of the print head 55 for service or maintenance and resetting due to the high issuing rates for card registrations.

The materials 2, 15, 17 and 18, can be modified in a number of ways.

Holograms, watermarks and like security features can be incorporated in the overlay 3. The barrier layer 4 can include compounds made up of materials such as indelible inks and iridescent inks, pearlescent and metallised inks, fluorescent and luminescent pigments, thermo-chromic and phosphorescent additives, light blocking compounds and ultraviolet stabilisers, printing fillers and opalescent admixtures.

The barrier layer 4 can be based on impact reactive materials or compounds to form the permanent images without applying heat using pressure such as encapsulated microcells containing liquids which burst on impact. In this modification, the thermal layer 5 is not used. The composition of the said materials can be electrosensitive comprising of surface conductive and reverse conductive properties for the conversion of electrical impulses instead of energy pulses. Alternatively, vacuum vapour-deposited metallised layers with electrical resistance can be used.

The said materials can be constructed for use as security, facsimile and other recording paper for bank drafts and giro forms, airline tickets and rail tickets, payroll and account documents, in particular labels and envelopes, all capable of being dispensed from a terminal 30 in modified form for other uses such as vending or labelling in continuous roll form or fan-fold form from containers fitted to the terminal device 30.

The said materials can include electronic chips or magnetic layers, and use any two-dimensional symbology for card registration such as linear, stacked, graphs or the data matrix type, as examplified above. Such symbologies are in the public domain and known as channel code, meter code, BC412, barcodes, planet code, PDF417, super code, maxicode, aztec code, data matrix, 3-DI, dataglyphs, snowflake code, and smart code, all capable of being used for terminal printing of the registration code 23 and registration code 27 in the thermal print zone 10.

The said materials can be used for signing names or writing information in the thermal print zone 10 using a heat pen or laser pen to form the permanent image without using the terminal device 30.

The terminal device 30 can be modified in a number of ways.

The terminal 30 can be adapted for reel feed or fan-fold feed of the card 1 by removing the base plate 52 of the printer 50 to allow continuous length of the said material, with horizontal lines of perforation and spaced apart for separation, to pass between a movable print head 55 and fixed flat platen 59, the card guides 65 the nip-rollers 54, the bridge guide 53, and emerge from the card slot 38. In this modification, the said material is stored in a container underneath the terminal 30 to form a terminal storage device 30 for dispensing by token or coin-operation for vending machines and amusement machines, for card or ticket issue.

The flat platen 59 can be pivotably connected to the solenoid 60 or supported in end guides to provide accurate alignment during displacement in front of the dot-zone array 56 or dot-line array 72. The flat platen 59 can be used in place of the circular platen 73 in the form of a straight edge with a resilient facing 74 bonded along the edge side of the flat platen 59 and displaceable by non rotatable means as well as rotatable means, and guided in slideable mountings in each vertical side plate 51, and spring biased in one direction of reciprocation. Alternatively, the flat platen 59, circular platen 73, can be pendulum mounted to side plates 51 for oscillatory motion instead.

The printer 50 and 70 can be adapted for fitting a ribbon cassette for depositing a thermal printed image directly onto the overlay 3 or barrier layer 4 of card 1. The print head 55 can be adapted with a dot-line array 72 and slidably mounted for dot-line printing in row by row sequential order onto the stationary card 1. The print head 55 is mounted in slide slots 57 for spring biased operation. The dot-zone array 56 and dot-line array 72 can be used for thermal printing a single or multiple line of dots or dashes to form permanent images in dot-matrix or segment configuration for numbers, letters, symbols or codes depending on the print area of the dot-zone array 56 and the dot-line array 72 for stationary print cycles.

The terminal device 30 is designed for modular side extension by removing the side panels 40 and fitting side sections for ticket printing to provide a terminal device 30 for printing cards and tickets using separate slots 38. The side panels 40 are fitted to the side sections of the terminal 30.

The terminal 30 is a database terminal which is carrier-linked to database servers to function as a telephone for electronic transactions and therefore can be used for on-line or dial-up modes of operation for inbound and outbound transmissions using existing line or wave means of communication.

What is claimed is:

1. A transaction system including at least one terminal and at least one card-type server which form a communication network for registering an impersonal card-identifier at the server and issue an impersonal card at the terminal, said system for executing a card-type registration, comprising:

(a) means to receive an unissued card-type in the terminal;
   (b) means to originate an impersonal card-identifier in the terminal;
   (c) means to write an encrypted registration code on the unissued card-type in the terminal;
   (d) means to transmit the impersonal card-identifier to a card-type server;
   (e) means to create a discrete datafile record to register the impersonal card-identifier in the database of the card-type server; and
   (f) means to transmit an instruction from the server to authorize the card-type transaction at the terminal.

2. A transaction system as in claim 1 for a card-type registration including:

means to detect a discrete user characteristic in a terminal;
   means to originate an impersonal user-identifier from the user characteristic in the terminal;
   means to transmit the impersonal card-identifier and user-identifier to the card-type server for datafile recording a set of impersonal identifiers in the database of the card-type server; and
   means to transmit an instruction from the server to authorize the card-type transaction at the terminal.

3. A transaction system as in claim 2 wherein each impersonal user-identifier is a live-scan image and the system includes means for capturing the said live-scan image in a terminal without reference to an individual user.

4. A transaction system as in claim 1 wherein each impersonal card-identifier is an encrypted registration code for writing and reading on an impersonal card-type and the system includes means for generating the said card-identifier and registration code in a terminal without reference to an individual user.

5. A transaction system as in claim 1 wherein a network of terminals communicate with a network of servers for card-type registration and card-type validation and the system includes means to identify unissued and issued card-types in a terminal for routing impersonal identifier data to the card-type server for each impersonal card-type.

6. A transaction system as in claim 1 wherein the encrypted registration code for each impersonal card-identifier consists of a two-dimensional symbology which forms part of a card-type registration for writing and reading the permanent symbology on an impersonal card-type in a terminal.

7. A transaction system as in claim 6 wherein the card-type registration includes writing a permanent serial number, transaction value or date on an impersonal card-type in a terminal.

8. A transaction system as in claim 1, wherein the card-type registration includes an encrypted registration code with card-type data for writing a permanent entry-line of discrete symbols and characters on an impersonal card-type in a terminal, and the system includes means for originating the card-type data in the database of a card-type server to create a discrete datafile record, and transmitting the card-type data to the terminal for writing and issuing the said registration code and said entry-line on the impersonal card-type.

9. A transaction system as in claim 1 wherein each unissued card-type is pre-printed with an issuer code to identify the name of the grantor and thereby identify the impersonal card-type in a terminal, and the system includes means for incorporating the issuer code in the encrypted registration code for each impersonal card-identifier to identify the card-type server for creating or locating a discrete datafile record.

10. A transaction system as in claim 9 wherein each encrypted card-identifier has a constant order to create the datafile for recording one constant and every encrypted card-identifier with the same constant order thereby locates the same datafile for matching two constants.

11. A transaction system as in claim 9 wherein the encrypted card-identifier is transmitted ahead of the encrypted user-identifier so as to reference a discrete datafile record in the database of a card-type server for datafile recording and datafile matching the set of identifiers in sequential order.

12. A transaction system as in claim 9 wherein the encrypted card-identifier and user-identifier is encoded before transmission and decoded after reception.

13. A transaction system as in claim 1 wherein the same encrypted card-identifier creates a discrete datafile record in the database of a card-type server for datafile recording and locates the same discrete datafile record in the database of the card-type server for datafile matching.

14. A transaction system as in claim 1 wherein each encrypted card-identifier and user-identifier for card-type registration, form a set of impersonal identifiers for datafile recording, and each card-identifier and user-identifier for card-type validation, form a set of impersonal identifiers for datafile matching.

15. A transaction system as in claim 1 for card-type validation, wherein the terminal is adapted for use by a cardholder to execute an impersonal card transaction, in which the terminal incorporates a card slot for inserting an issued card-type and a card scanner and biometric sensor for generating a set of impersonal identifiers, and including means for transmitting the impersonal identifiers to a card-type server for datafile matching, to authorize the impersonal card transaction at the terminal.

16. A system as in claim 1 wherein an issued card-type comprises two portions, which are separable, for printing the same encrypted registration code on a cardholder portion and a grantor portion, and each said portion includes a discrete barrier area for printing thereon the said encrypted registration code, and in which the cardholder portion is used for card-type registration in said system using said terminal for datafile recording in the database of a card-type server.

17. An impersonal card designed and adapted to be used in a terminal for card-type registration and card-type validation carried out in a system according to claim 1, said card comprising a multi-layer material including a layer of the thermographic material covered by a barrier layer to prevent fade and wear of a thermographic image formed on the said material, said thermographic material placed within a discrete barrier area to have printed thereon a card-type registration incorporating an encrypted registration code.

18. An impersonal card as in claim 17 in which the material is machine printed with information on one layer and, separately, the material is terminal printed with information on another layer.

19. An impersonal card as in claim 17 in which the material is constructed in multiple layers for thermographic printing in a terminal for printing permanent images on the material in the discrete barrier area at the second stop position and scanning the permanent registration code image at the first stop position.

20. An impersonal card as in claim 17 in which the material in the discrete barrier area is constructed of two layers comprising a substrate layer with temperature sensitive properties and a barrier layer with light and wear resistant properties applied to the substrate layer.

21. An impersonal card as in claim 20 in which the discrete barrier area is capable of changing state by thermo-chemical reaction or by the thermo-chromic reaction for printing a card-type registration.

22. An impersonal card as in claim 20 in which the barrier layer is applied to the substrate layer by machine printing to deposit a protective coating of ink for terminal printing the information on to the barrier layer.

23. An impersonal card as in claim 17 in which the material is constructed of three layers comprising a substrate layer, a thermal layer with temperature sensitive and adhesive properties applied to the substrate layer and a barrier layer applied to the thermal layer for machine printing information on to the barrier layer.

24. An impersonal card as in claim 17 in which the material is laminate constructed of four or five layers comprising a substrate layer with machine printed information on each face, a transparent film layer with adhesive properties for bonding to one face of the substrate layer, and a transparent film layer with adhesive properties on one side of the film for bonding to the other face of the substrate layer, and an applied thermal layer and barrier layer within a discrete barrier area on the other side of the film for terminal printed information.

25. An impersonal card as in claim 24 in which the discrete barrier area on the transparent film layer is surface treated for machine coating the thermal layer and barrier layer to provide a pre-printed laminate material with a discrete thermal panel for terminal printing thermographic permanent images thereon with wear and light resistant properties.

26. An impersonal card as in claim 17 in which the material is produced as a single item for terminal issue as a card, ticket, token, form or similar for a card-type registration.

27. An impersonal card as in claim 17 in which the material is produced in fan-fold format for terminal issue as a card, ticket, token, form a similar for a card-type registration.

28. An impersonal card as in claim 17 in which the material is produced with spaced apart perforations to provide single items comprising two parts or fan-fold parts for card-type registration.

29. An impersonal card as in claim 17 in which the material is produced with machine printed information for card description on the front and rear face and terminal printed information for card registration on the front or rear face of the material.

30. An impersonal card as in claim 17 in which the material includes opaque barrier areas to define text zones and code zones for machine printing information on the front and rear face of the material.

31. An impersonal card as in claim 17 in which the barrier layer incorporates materials with sensor readable properties for detecting counterfeit material for a card-type registration or card-type validation.

32. A transaction system including at least one terminal and at least one card-type server which form a communication network for validating an impersonal card-identifier at the server and accept an impersonal card at the terminal, said system for executing a card-type validation, comprising:
   (a) means to receive an issued card-type in the terminal;
   (b) means to read an encrypted registration code on the issued card-type to generate an impersonal card-identifier in the terminal;
   (c) means to transmit the impersonal card-identifier to a card-type server; and
   (d) means to locate a discrete datafile record to validate the impersonal card-identifier in the database of the card-type server; and
   (e) means to transmit an instruction from the card-type server to authorize the card-type transaction at the terminal.

33. A transaction system as in claim 32 for a card-type validation including:
   means to detect a discrete user characteristic in a terminal;
   means to generate an impersonal user-identifier from the user characteristic in the terminal; means to enter a transaction value in the terminal for acceptance at the card-type server;
   means to transmit the impersonal card-identifier and user-identifier and identifiers in the database of the card-type server, and accept the transaction value; and
   means to transmit an instruction from the server to authorize the card-type transaction at the terminal.

34. A transaction system including a network of terminals and a network of servers which form separate communication networks for executing impersonal transactions, originating impersonal identifiers at the terminals, recording the impersonal identifiers at the servers for card-type registration and authorizing impersonal identifiers at the terminals, said system for executing an impersonal transaction, comprising:
   (a) means for receiving an unissued card-type in a terminal;
   (b) means for originating an impersonal card-identifier in the terminal;
   (c) means for writing an encrypted registration code on the unissued card-type in the terminal;
   (d) means for originating an impersonal user-identifier in the terminal;
   (e) means for transmitting a set of impersonal identifiers from the terminal to a card-type server to create a discrete datafile record to register the set of impersonal identifiers in the database of a card-type server; and
   (f) means for transmitting an instruction from the card-type server to the terminal to authorize the impersonal transaction for a discrete card and user.

35. A transaction system as in claim 34 wherein each impersonal card-identifier is an encrypted registration code for writing and reading on an impersonal card-type and the system includes means for generating the said card-identifier and registration code in a terminal without reference to an individual user.

36. A transaction system as in claim 34 wherein each impersonal user-identifier is a live-scan image and the system includes means for capturing the said five-scan image in a terminal without reference to an individual user.

37. A transaction system including a network of terminals and a network of servers which form separate communication networks for executing impersonal transactions, generating impersonal identifiers at the terminals, matching the impersonal identifiers at the servers for card-type validation and authorizing impersonal identifiers at the terminals, said system for executing an impersonal transaction comprising:
   (a) means for receiving an issued card-type in a terminal;
   (b) means for reading an encrypted registration code on the issued card-type to generate an impersonal card-identifier in the terminal;
   (c) means for generating an impersonal user-identifier in the terminal;
   (d) means for generating a transaction value at the terminal;
   (e) means for transmitting a set of impersonal identifiers and a transaction value from the terminal to a card-type server;
   (f) means to locate a discrete datafile record to validate the set of impersonal identifiers in the database of a card-type server and accept the transaction value; and
   (g) means for transmitting an instruction from the card-type server to the terminal to authorize the impersonal transaction for a discrete card and user.

38. A transaction terminal for use with the transaction system of claim 1 for card-type validation, wherein the terminal is adapted for use by an attendant and a cardholder to execute an impersonal card transaction in which the terminal incorporates:
   (a) a card sensor and biometric sensor for generating impersonal identifier data in the terminal;
   (b) a display and keyboard for generating impersonal transaction data in the terminal, and
   (c) a computer and database for compiling the identifier data and transaction data in sequential order for encrypted transmittal, and including means for transmitting the identifier and transaction data to a card-type server for datafile matching to authorize the impersonal card transaction at the terminal.

39. A transaction terminal as in claim 38 is further adapted for use by an attendant and a cardholder to incorporate a card printer for printing a permanent card registration on an unissued card-type and scanning the encrypted registration code in the terminal.

40. A transaction terminal as in claim 38 in which the terminal is adapted for use by an attendant and a cardholder at a point of sale for issuing and accepting impersonal card-types to provide a dual function terminal for attendant and cardholder operation, comprising:
   (a) a keyboard and display for use by an attendant to execute an impersonal card transaction at the point of sale; and
   (b) a biometric sensor and a further display for use by a cardholder to sanction an impersonal card transaction at the point of sale.

41. A transaction terminal as in claim 40 for card-type validation, wherein the terminal includes a common entry and exit slot to insert an issued card-type for scanning an issuer code and an encrypted registration code at a first stop position in the terminal.

42. A transaction terminal as in claim 40 for card-type registration, wherein the terminal includes a common entry and exit slot and inline pathway for conveying a unissued card-type between a first stop position and a second stop position in a card printer with engaged rollers for gripping and transporting the card, to position the card at the second stop position for printing a card-type registration and to position the card at the first stop position for scanning an issuer code and an encrypted registration code, before removing the card from the exit slot.

43. A terminal as in claim 42 and further comprising a fixing print head and movable platen to provide a pathway for dot-line printing a thermographic card-type registration on the card at the second stop position.

44. A terminal as in claim 42 and further comprising a movable print head and fixed platen to provide a pathway for dot-line printing a thermographic card-type registration on the card at the second stop position.

45. A terminal as in claim 42 and also including a compartment to store a card material in fan-fold format with perforated folds for printing a card-type registration at the second stop position, means for scanning an encrypted registration code at the first stop position and means for dispensing and separating the card material at the exit slot for issuing impersonal card-types at a terminal.

46. A transaction terminal as in claim 38 in which the biometric sensor is adapted to capture a live scan image of the user and comprises guide means for positioning a finger on the sensor by aligning the cuticle of the fingernail with register lines on each side of the sensor.

47. A terminal as in claim 38 and also including detachable side panels for extending the terminal with additional slots to register and validate cards and tickets made of different materials in sheet, reel or fan-fold format.

* * * * *